(12) United States Patent
Eveley

(10) Patent No.: US 10,093,354 B2
(45) Date of Patent: Oct. 9, 2018

(54) HYDRAULIC STABILIZING UNIT FOR STEER AXLES

(71) Applicant: Dawn-Marie Eveley, Stoney Creek (CA)

(72) Inventor: Nicholas Eveley, Stoney Creek (CA)

(73) Assignee: Dawn-Marie Eveley, Stoney Creek (CA)

( * ) Notice: Subject to any disclaimer, the term of this patent is extended or adjusted under 35 U.S.C. 154(b) by 81 days.

(21) Appl. No.: 15/410,121

(22) Filed: Jan. 19, 2017

(65) Prior Publication Data

US 2017/0217486 A1    Aug. 3, 2017

Related U.S. Application Data

(60) Provisional application No. 62/280,153, filed on Jan. 19, 2016.

(51) Int. Cl.
| | |
|---|---|
| *B62D 7/22* | (2006.01) |
| *B62D 7/14* | (2006.01) |
| *B60G 9/00* | (2006.01) |
| *B60G 11/26* | (2006.01) |

(52) U.S. Cl.
CPC ............... *B62D 7/228* (2013.01); *B60G 9/00* (2013.01); *B60G 9/003* (2013.01); *B60G 11/265* (2013.01); *B62D 7/144* (2013.01); *B60G 2200/44* (2013.01); *B60G 2202/152* (2013.01)

(58) Field of Classification Search
CPC .......... B62D 7/144; B62D 7/228; B60G 9/00; B60G 9/003; B60G 11/265; B60G 13/08; B60G 13/10; B60G 2200/44; B60G 2202/152; B60G 2202/24; B60G 2202/242

See application file for complete search history.

(56) References Cited

U.S. PATENT DOCUMENTS

| | | | | |
|---|---|---|---|---|
| 3,527,316 | A * | 9/1970 | Jones, Jr. ............... | B60B 35/003 180/437 |
| 5,505,481 | A * | 4/1996 | VanDenberg .......... | B60G 11/27 280/124.157 |
| 6,669,303 | B2 * | 12/2003 | Dodd ....................... | B60G 9/00 180/209 |
| 6,796,566 | B2 * | 9/2004 | VanDenberg ............ | B60G 7/02 280/124.128 |
| 6,817,620 | B1 * | 11/2004 | Howard ................. | B62D 7/228 280/89.11 |
| 7,416,198 | B2 * | 8/2008 | Blaszynski ............ | B62D 7/228 280/89.12 |
| 8,070,177 | B2 | 12/2011 | Eveley | |
| 8,276,925 | B2 * | 10/2012 | Varela ..................... | B60G 9/00 180/438 |

(Continued)

FOREIGN PATENT DOCUMENTS

| | | | | | |
|---|---|---|---|---|---|
| JP | | 05178231 A | * | 7/1993 | ............. B60G 7/006 |
| JP | | 2012056410 A | * | 3/2012 | ............. B62D 7/228 |

*Primary Examiner* — Laura Freedman
(74) *Attorney, Agent, or Firm* — Harness, Dickey & Pierce, P.L.C.

(57) ABSTRACT

The present invention relates to a new hydraulic stabilizing unit that can be mounted onto any self-steering axle assembly that utilises a pneumatic stabilizing system. The hydraulic stabilizer works in conjunction with the pneumatic stabilizer to eliminate a "dead zone" of the pneumatic system to avoid wheel shimmy and hop conditions associated with out of specification caster angles on the axle.

2 Claims, 4 Drawing Sheets

(56) References Cited

U.S. PATENT DOCUMENTS

| | | |
|---|---|---|
| 8,622,406 B2 | 1/2014 | Eveley |
| 8,678,407 B2 | 3/2014 | Eveley |
| 9,073,402 B2 * | 7/2015 | Elbers .................. B60G 21/051 |
| 9,376,098 B2 | 6/2016 | Eveley |

* cited by examiner

US 10,093,354 B2

HYDRAULIC STABILIZING UNIT FOR STEER AXLES

CROSS-REFERENCE TO RELATED APPLICATIONS

This application claims the benefit of U.S. Provisional Application No. 62/280,153, filed on Jan. 19, 2016. The entire disclosure of the above application is incorporated herein by reference.

FIELD OF THE INVENTION

This invention relates to self-steering axles for multi axle heavy duty trucks and trailers. The operating principal is easy to understand.

BACKGROUND OF THE INVENTION

Referring to FIG. 1, which is a perspective view of a steer axle assembly according to the present invention, an axle main beam 15, which is a load bearing structure, has offset ends 24 which extend forward from the axle main beam. Stub axles 20 are pivotably mounted to the ends 24 by machined kingpin assemblies 22. The offset that exists between the axis of rotation of the stub axle assembly and the axis of the axle main beam forms the basic geometric character of all leading kingpin self-steering axles. A greater offset leads to an increased sensitivity of the axle steering function.

A tie rod 14 connects both pivot ends together and harmonises the wheels' steering behaviour. The axle is mounted with the leading kingpins facing the forward direction of the truck or trailer. Tie rod assemblies can be mounted forward or rearward of the axle beam depending upon the geometry of the suspension being used.

Self-steering axles tend to return naturally to a neutral (straight forward) position once the vehicle returns to its normal forward direction after making a turn. A stabilizer system consisting of a resilient member in the form of a double convolute air spring 12 is attached to the main axle beam and the tie rod assembly and has mechanical pivoting connections (lever arms 7 and 8) to allow the air spring 12 to constantly apply a resistance to a respective spring ends 17 and 18 of each of the lever arms 7 and 8 against the steering motion of the axle, and help the axle return to the normal straight ahead position after the turn.

The double convolute air spring 12 receives a constant regulated supply of air pressure from the main trailer/truck system.

Axle camber is pre-set at the factory during the production process. Caster of the axle is set when the axle is assembled to the suspension and mounted to the trailer or truck. The manufacturer of the axle supplies definite numbers for the setting of the caster angle which is normally 0 degrees to 3.0 degrees positive which is set to the trailer manufacturer's specified ride height and that is designed to have the trailer use a specified coupler height. However, in today's transportation scene there is a multiplicity of fifth wheel mounting heights and trailer coupling heights and also, a great variance in the suspensions being used. The positioning of the axle on the trailer also plays an important role in the performance of the steering axle. The closer the axle is to the front of the trailer the more it will be affected by the variance in coupler heights. For example, connecting a 48" coupler height trailer to a 51" truck fifth wheel height will change the caster to 3-5 degrees depending upon the position of the axle on the trailer. This is an out of specification situation.

Such changes in caster angle will affect steering performance, increase tire wear, and introduce wheel hop and shimmy into the steering axle. The double convolute air spring system is not sensitive enough to be able to adjust to the changes in the caster angle, therefore, it cannot control out of specification situations. This problem is apparent in all leading kingpin design steering axles using air springs as their main source of stabilization. This problem is intensified when the axle is closer to the tractor.

SUMMARY OF THE INVENTION

The present invention relates to a new hydraulic stabilizing unit that can be mounted onto any self-steering axle assembly that utilises a pneumatic stabilizing system. The hydraulic stabilizer unit is mounted between the lever arms and works in conjunction with the air stabilizer to eliminate a "dead zone" of the pneumatic system and remove the wheel shimmy and hop conditions associated with the change in the caster angle on the axle.

DESCRIPTION OF DRAWINGS

Preferred embodiments of the present invention are described below with reference to the accompanied drawings in which.

DESCRIPTION OF PREFERRED EMBODIMENTS

Figure 1:
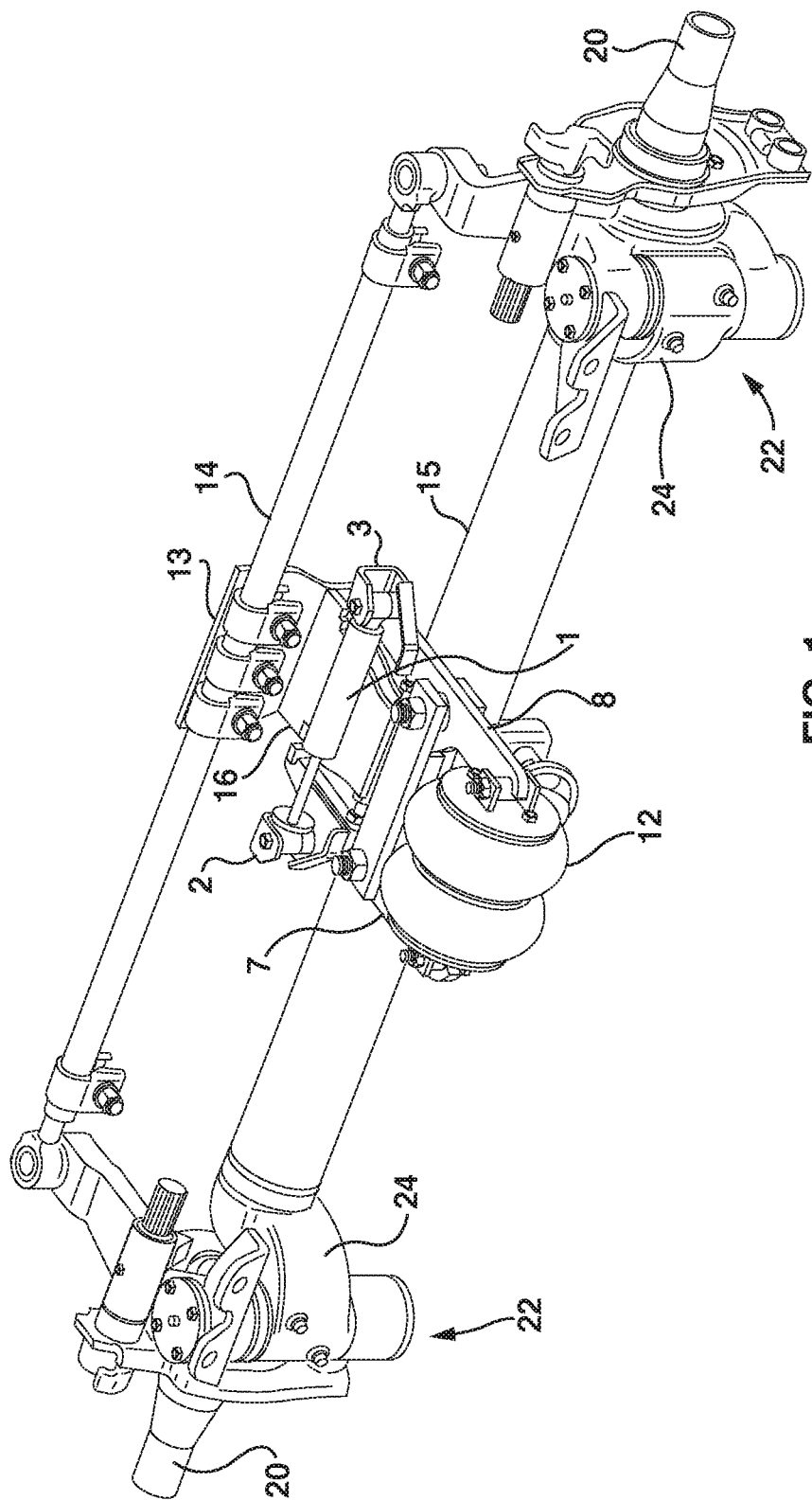
FIG. 1 is an enlarged perspective view of a steer axle assembly incorporating hydraulic dampening system according to the present invention.
Figure 2:
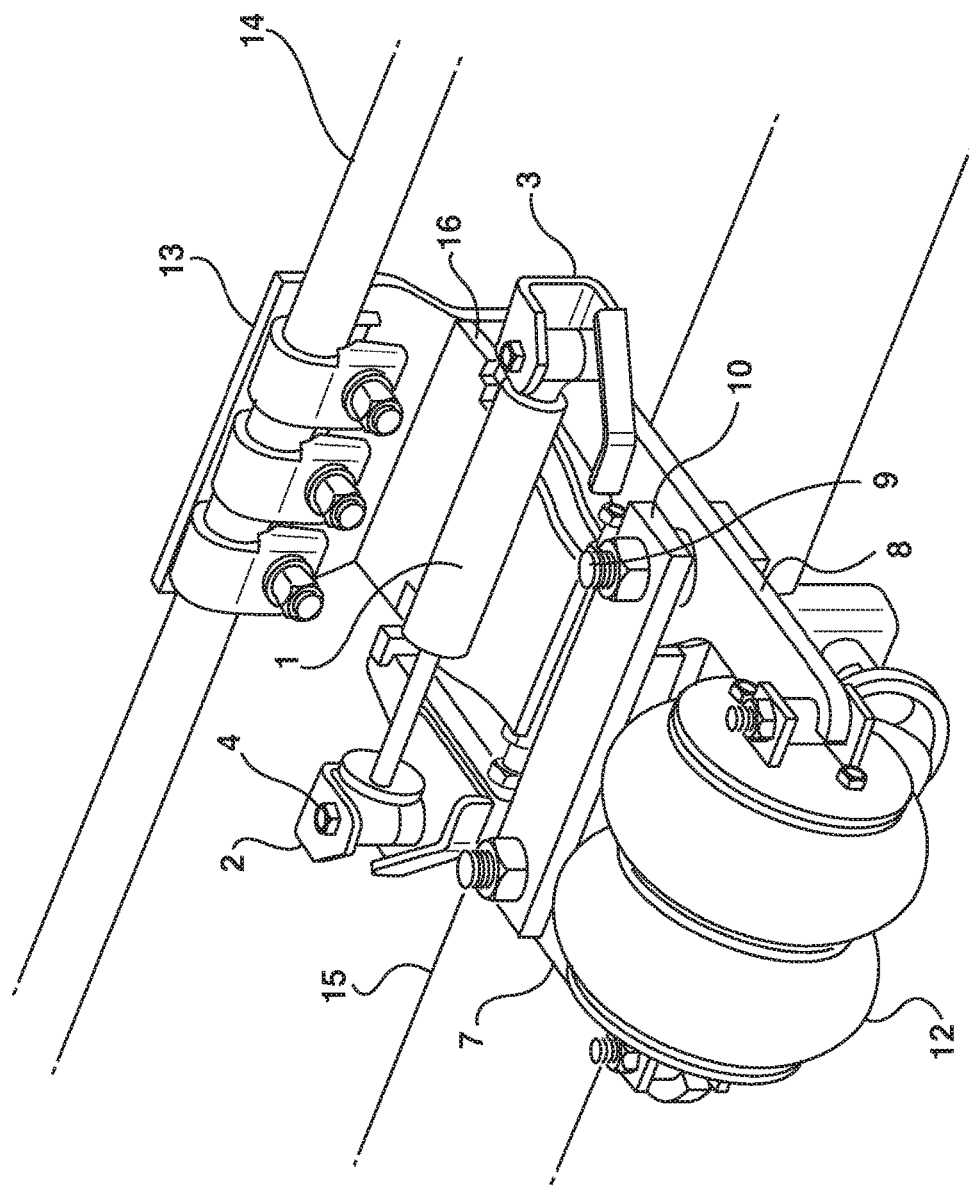
FIG. 2 is a perspective view corresponding to a central portion of FIG. 1 showing the stabilizing assembly.
Figure 4:
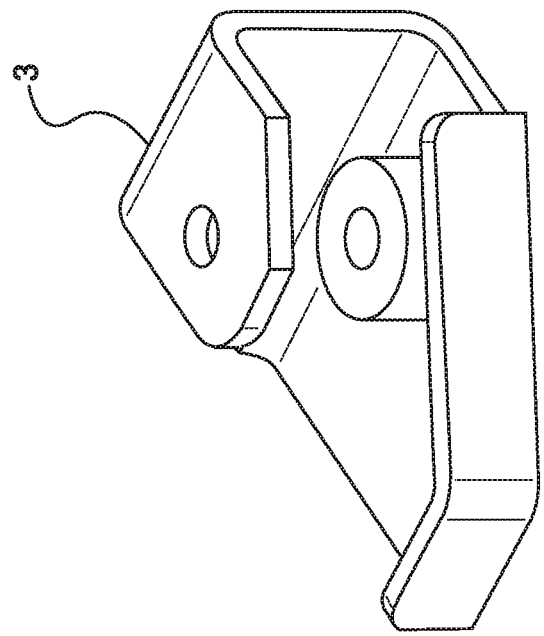
FIG. 4 is a perspective view of a right hand bracket for attachment to a right hand lever arm.
Figure 3:
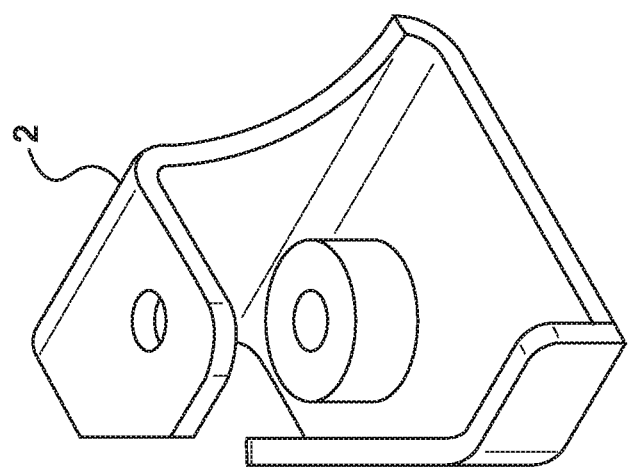
FIG. 3 is a perspective view of a left hand bracket for attachment to a left hand lever arm according to the present invention.
Figure 5:
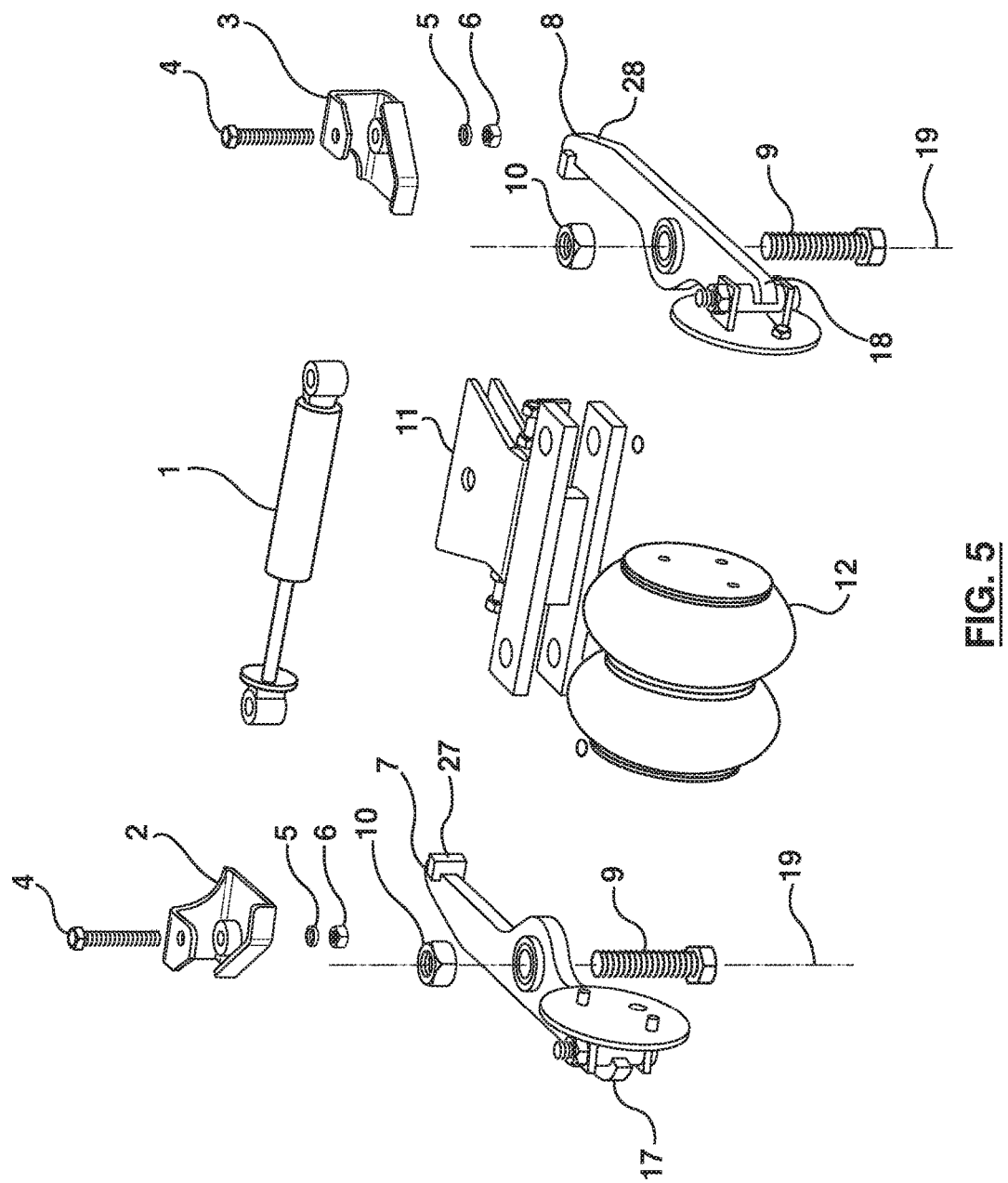
FIG. 5 is an exploded view of the hydraulically stabilized steer axle according to the present invention.

The hydraulic stabilizing unit of the present invention can be mounted on any steer axle that uses a pneumatic centering stabilizer 12 with lever arms 7 and 8 coupled to a tie rod lock plate 16 at a respective tie rod end 27 and 28 of each of the lever arms 7 and 8. The lever arms are in turn coupled to the tie rod 14 via the tie rod lock plate 16. A left stabilizing bracket 2 and a right stabilizing bracket 3 are welded onto the left lever arm 7 and the right lever arm 8 respectively. A hydraulic stabilizing unit 1 is bolted into the left stabilizing bracket 2 and the right stabilizing bracket 3 using hydraulic stabilizing unit bolts 4, washers 5 and nuts 6.

As the trailer enters a turn the tires which are in contact with the road receive pressure from the side. Once the pressure overcomes the force from the air pressure in the pneumatic centering stabilizer 12, the kingpin assemblies 22 will rotate about the ends 24. As the kingpin assemblies 22 rotate, the tie rod 14 starts to move laterally. The tie rod lock plate 16 moves the lever arms 7 and 8 laterally. The lever arms 7 and 8 rotate about respective lever arm axes 19 coaxial with lever arm pivot bolts 9 and nuts 10. As lever arms 7 and 8 move, they exert pressure on the pneumatic centering stabilizer 12, thus squeezing the pneumatic centering unit 12. As the trailer straightens out when it comes out of a turn the air pressure will return the pneumatic centering unit 12 to its normal shape and align the steer axle with a line of travel of the trailer.

The hydraulic stabilizing unit 1 dampens the movement of the pneumatic centering unit making it "hop" less as it moves. The hydraulic stabilizing unit 1 is double acting in that it resists both extension and retraction forces and is designed to keep the lever arms 7 and 8 in contact with the tie rod lock plate 16.

The foregoing description of the preferred embodiments and examples of the apparatus and process of the invention have been presented to illustrate the principles of the invention and not to limit the invention to the particular embodiments illustrated. It is intended that the scope of the invention be defined by all of the embodiments encompassed within the claims and/or their equivalents.

1. Hydraulic Stabilizing Unit
2. Left Hand Stabilizing Bracket
3. Right Hand Stabilizing Bracket
4. Hydraulic Stabilizing Unit Bolt
5. Washer
6. Nut
7. Left Hand Lever Arm
8. Right Hand Lever Arm
9. Lever Arm Pivot Bolt
10. Lever Arm Pivot Nut
11. Tie Rod Guide Assembly
12. Pneumatic Centering Unit
13. Tie Rod Lock Plate Assembly
14. Tie Rod
15. Steer Axle
16. Tie Rod Lock Plate
17. Tie Rod End of Left Hand Lever Arm
18. Tie Rod End of Right Hand Lever Arm
19. Lever Arm Axis
22. Kingpin Assemblies
24. Ends of Axle Main Beam
27. Spring End of Left Hand Lever Arm
28. Spring End of Right Hand Lever Arm

What is claimed is:

1. A self-steering axle comprising:
a main axle beam which interacts with a tie rod through a pair of lever arms rockingly coupled to the main axle beam for rocking about a lever axis generally orthogonal to said tie rod and said main axle beam;
each said lever arm having a tie rod end opposite a spring end with said lever axis therebetween;
said tie rod ends receiving translational input from said tie rod to cause said lever arms to rock about said lever axis;
said spring ends acting against a resilient member mounted therebetween to resist said translational input; and
a double acting hydraulic dampener connecting said lever arms between said lever axis and said tie rod ends to resist movement of said tie rod ends of said lever arms toward and away from each other.

2. A method of stabilizing a self-steering axle having a main axle beam which interacts with a tie rod through a pair of lever arms rockingly coupled to the main axle beam for rocking about a lever axis generally orthogonal to said tie rod and said main axle beam, each said lever arms having a tie rod end opposite a spring end with said lever axis therebetween, said tie rod ends receiving translational input from said tie rod to cause said lever arms to rock about said lever axis, said spring ends acting against a resilient member mounted therebetween to resist said translational input, said method comprising:
connecting said lever arms with a double acting hydraulic dampener between said lever axis and said tie rod ends to resist movement of said tie rod ends of said lever arms toward and away from each other.

* * * * *